(12) United States Patent
Kasler et al.

(10) Patent No.: US 10,792,763 B2
(45) Date of Patent: Oct. 6, 2020

(54) LASER WELDING

(71) Applicant: ROLLS-ROYCE plc, London (GB)

(72) Inventors: Richard D Kasler, Husbands Bosworth (GB); Mark A Saint, Nottingham (GB)

(73) Assignee: ROLLS-ROYCE plc, London (GB)

( * ) Notice: Subject to any disclaimer, the term of this patent is extended or adjusted under 35 U.S.C. 154(b) by 418 days.

(21) Appl. No.: 15/622,635

(22) Filed: Jun. 14, 2017

(65) Prior Publication Data

US 2017/0368639 A1     Dec. 28, 2017

(30) Foreign Application Priority Data

Jun. 28, 2016 (GB) .................................. 1611190.8

(51) Int. Cl.
| | |
|---|---|
| *B23K 26/00* | (2014.01) |
| *B23K 26/24* | (2014.01) |
| *B23K 37/04* | (2006.01) |
| *B23K 26/14* | (2014.01) |
| *B23K 26/12* | (2014.01) |

(52) U.S. Cl.
CPC ............ *B23K 26/24* (2013.01); *B23K 26/123* (2013.01); *B23K 26/147* (2013.01); *B23K 37/04* (2013.01); *B23K 37/0435* (2013.01)

(58) Field of Classification Search
CPC .... B23K 26/26; B23K 26/147; B23K 26/123; B23K 37/04; B23K 37/0435
USPC ........ 219/74, 161, 121.6, 121.63–64, 121.82
See application file for complete search history.

(56) References Cited

U.S. PATENT DOCUMENTS

| | | | | |
|---|---|---|---|---|
| 6,024,354 A | * | 2/2000 | Yonezawa ............ | B23Q 1/0081 269/309 |
| 6,153,853 A | * | 11/2000 | Maruyama ............ | B23K 26/04 219/121.63 |
| 2004/0182843 A1 | | 9/2004 | Schreiber et al. | |
| 2015/0210196 A1 | * | 7/2015 | Yamamoto ............ | B60N 2/682 219/121.64 |

FOREIGN PATENT DOCUMENTS

| | | |
|---|---|---|
| CN | 102935568 A | 2/2013 |
| CN | 102935568 B | 1/2015 |
| CN | 204818440 U | 12/2015 |
| DE | 102 61 073 A1 | 7/2004 |

(Continued)

OTHER PUBLICATIONS

Dec. 14, 2016 Search Report issued in British Patent Application No. 1611190.8.

(Continued)

*Primary Examiner* — Hung D Nguyen
(74) *Attorney, Agent, or Firm* — Oliff PLC

(57) ABSTRACT

The present invention provides a laser welding process and a holding fixture for holding a first and a second body during a laser welding process. A first body and a second body for welding together along at least one weld line to form a joined component are immobilised in the holding fixture by a back clamp and a front clamp of the fixture. A shielding gas is supplied, from respective plenums formed in the back and front clamps, to back and front sides of the component along the weld line. Laser welding the first and second bodies together along the weld line, the laser weld thus-formed penetrating from the front side to the back side of the component.

12 Claims, 4 Drawing Sheets

(56) References Cited

FOREIGN PATENT DOCUMENTS

JP      H10-180472 A     7/1998
KR    2001-0027723 A    4/2001

OTHER PUBLICATIONS

Nov. 27, 2017 Extended European Search Report issued in European Patent Application No. EP 17175276.9.
Matuszewski, Heinrich. "Handbuch Vorrichtungen" In: "Handbuch Vorrichtungen", Dec. 31, 1986, Vieweg+Teubner Verlag, XP055426394.
Oeffele, Florian. "Remote-Laserstrahlschweißen Mit Brillanten Laserstrahlquellen". Dec. 31, 2012, pp. 75-79, XP055425937.

\* cited by examiner

LASER WELDING

FIELD OF THE INVENTION

The present invention relates to a laser welding process, and a holding fixture for holding components during a laser welding process.

BACKGROUND

During a laser welding process, it may be beneficial to provide a holding fixture to constrain or immobilise components to be welded during the welding process, thereby avoiding relative movement of the components to be welded during the welding process.

It is also known that the presence of some atmospheric gases (e.g. water vapour and oxygen) during welding may undesirably affect the quality of a weld due to, for example, oxidation of the welded material, Current solutions to this problem include performing welding in a substantially evacuated chamber, or alternatively, provision of a shielding gas. A shielding gas is generally an inert, or a semi-inert, gas intended to protect the weld area from being affected by atmospheric gases.

Performing welding in a substantially evacuated chamber, or in a fully-enclosed welding environment filled with a shielding gas has significant drawbacks, such as the time needed to evacuate the chamber, or to replace air in an enclosed welding environment with a shielding atmosphere. Other drawbacks are the cost of such chambers/enclosed environments, and the cost of consumables such as shielding gas.

Another option, therefore, is to supply shielding gas from a laser welding head, so that the gas is applied directly to the weld pool as welding occurs, and application of the shielding gas follows the movement of the laser welding head. However, such processes also suffer a problem, in particular when movement of the laser head is rapid, wherein the trailing shielding gas cannot provide adequate shielding behind the weld pool. This can cause unwanted oxidation of the welded material. A further problem arises when the weld penetrates through the thickness of the component such that the side of the weld distal from the head may not receive adequate shielding gas.

SUMMARY

The present invention aims to address the above problems, and, in general terms, the present invention incorporates a shielding gas supply system into a holding fixture for use in a laser welding process.

Thus, in a first aspect, the present invention provides a laser welding process including:
  providing a first body and a second body for welding together along at least one weld line to form a joined component;
  immobilising the first and second bodies in a holding fixture by a back clamp and a front clamp of the fixture;
  supplying, from respective plenums formed in the back and front clamps, a shielding gas to back and front sides of the component along the weld line; and
  laser welding the first and second bodies together along the weld line, the laser weld thus-formed penetrating from the front side to the back side of the component.

In a second aspect, the present invention provides a holding fixture for holding a first and a second body during a laser welding process in which the bodies are welded together along at least one weld line to form a joined component, the holding fixture having:
  a back clamp and a front clamp for immobilising the first and second bodies in the fixture; and
  plenums formed respectively in the back and front clamps, and adapted to supply, in use, a shielding gas to back and front sides of the component along the weld line.

By supplying the shielding gas through plenums formed respectively in back and front clamps of the holding fixture, the present invention can reduce the cost and/or volume of shielding gas used per component build, improve build rate, and reduce the cost of secondary operations, and reduce in process dwell/delays, More particularly, the plenums formed in the clamps enable the provision of shielding gas along the weld line at both front and back sides of the component, and accordingly provide shielding gas at both sides of a through-thickness weld. In this way, the quality of the weld can also be improved. Additionally, because the shielding gas is directed to the weld line, the amount of shielding gas used can be substantially less than is used in a process involving a conventional fully-enclosed weld environment.

Optional features of the invention will now be set out. These are applicable singly or in any combination with any aspect of the invention.

Typically the plenums are formed as respective elongate channels which run parallel to the path of the weld line.

The first and second bodies may be immobilised in the laser welding holding fixture such that before laser welding to form the joined component, there is a gap of 0.2 mm or less between the bodies along the weld line. Preferably the gap may be 0.1 mm or less. Presence of a gap can promote proper evacuation of vapours produced during the welding process, which vapours may otherwise affect weld quality. Placing a maximum limit on the gap size can help to ensure weld quality and prevent a weak join along the weld line. However, a gap is not necessarily required, and accordingly the first and second bodies may abut one another along the weld line The first and second bodies to be welded may have respective datum features. The holding fixture may also have corresponding datum features which match the datum feature of the first and second bodies. Accordingly, the laser welding process may further include a step, preliminary to immobilising the first and second bodies, of locating the first and second bodies in the holding fixture such that the datum features match up with corresponding datum features of the fixture. This can enable more accurate positioning of the bodies to be welded, and accordingly may increase the quality of the weld in the joined component.

The laser welding is typically performed from the front side of the component. The type of welding performed in the welding process is not particularly limited. For example, the welding may be lap welding, butt welding, or fillet welding, or any combination of these types of welding. Filler wire or powder may be used when welding. The number of weld lines is not particularly limited. For example, there may be one or more first weld lines around an edge portion of the component, and one or more additional weld lines within a central portion of the component e.g. to form one or more internal pockets within the component. Each weld line can have corresponding plenums formed in the back and front clamps for the supply of the shielding gas. Thus each clamp can have more than one plenum.

Where the laser welding is performed from the front side of the component, the plenum formed in the front clamp may be laterally offset from the weld line, and the shielding gas may be supplied through a slit extending through the front clamp from the front clamp plenum to an outlet adjacent the front surface of the component at the weld line, such that a layer of shielding gas is formed over the weld line. Such a configuration can enable the laser to access the weld line, i.e. avoiding obstruction of the weld line by the front clamp. In such a configuration, the slit outlet may be spaced a distance of at least 3 mm from the centre of the weld line, or preferably a distance of at least 5 mm therefrom. The layer of shielding gas may then extend laterally from the outlet to provide shielding coverage for at least 3 mm, or at least 5 mm, beyond the centre of the weld line.

The holding fixture may have plural front clamps, each forming one or more plenums for supplying the shielding gas to the front side of the component along one or more respective weld lines. The number of front clamps is not particularly limited, but there may be at least two front clamps. The fixture may, for example, have two front clamps for clamping edge portions of the first and second bodies. The fixture may further have an additional front clamp for clamping a central portion of the first and second bodies. The front clamps may be applied simultaneously, or they may be applied sequentially, in any suitable order. Sequential application of front clamps can allow a multi-stage clamping and welding process, in cases where a weld line may otherwise be obstructed by one or more front clamps.

The plenum formed in the back clamp may be a channel located directly behind, and opening onto, the weld line. The channel may be a U-shaped channel, or a channel with any other profile suitable for the flow requirements of the shielding gas through the plenum. The width of the channel may be wider than the intended width of the weld. For example, the width of the channel may be at least 2 mm wider than the width of the weld bead of the weld. Preferably, the width of the channel is at least 4 mm wider than the width of the weld bead, allowing approximately 2 mm of clearance on either side of the weld. This can help to provide full coverage of the shielding gas across the width of the weld during the laser welding process.

The shielding gas which is used in the laser welding process is not particularly limited, and may be any suitable inert or semi-inert gas. Additionally, the shielding gas may be selected appropriately according to the materials of the first and second bodies, or may be selected for reasons of cost and/or process efficiency. The shielding gas may be, for example, argon.

The bodies may be formed, for example, of titanium or titanium alloy (e.g. 6/4 titanium alloy), or of stainless steel.

The holding fixture may be used in combination with a laser welding system to provide laser welding of the first and second bodies together along the weld line. The laser welding system may have a controller, adapted to control features of the laser welding system, i.e. the movement and characteristics of the laser beam, Conveniently, the laser welding system controller may also be adapted to control the supply of the shielding gas from the plenums in the back and front clamps, Where there are multiple back and front plenums (e.g. because there are multiple weld lines), the controller may control the supply of gas such that gas is only supplied to a subset of the total number of plenums at any one time, i.e. as the weld lines are welded. This may improve the efficiency of shielding gas utilisation. The controller may also control shielding gas flow times to given plenums, e.g. to ensure adequate purging before welding.

Flow rate control devices which control the flow of shielding gas into the plenums may be provided. These may be digital or analogue. Provision of flow rate control devices can help to optimise shielding gas utilisation.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1A:
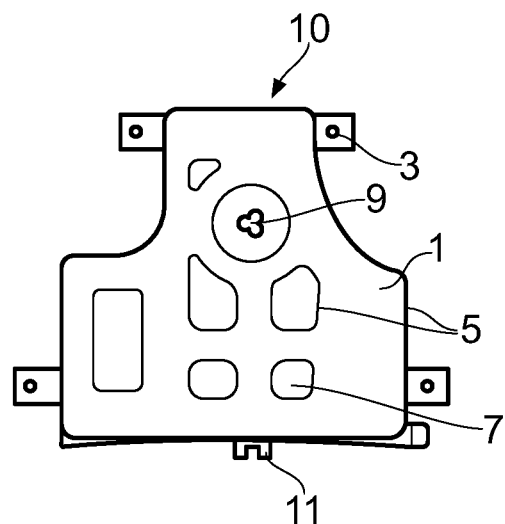
FIG. 1a shows a front view of a joined component.
Figure 1B:
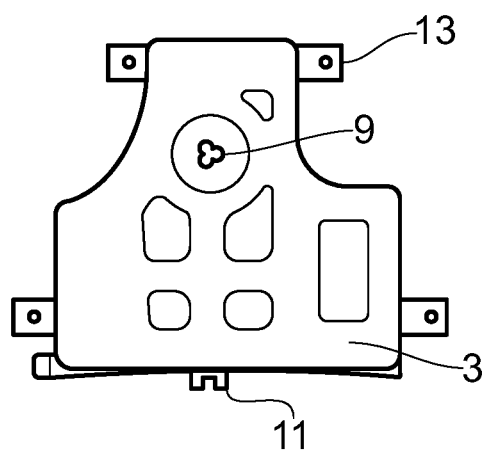
FIG. 1b shows a back view of a joined component.
Figure 1C:
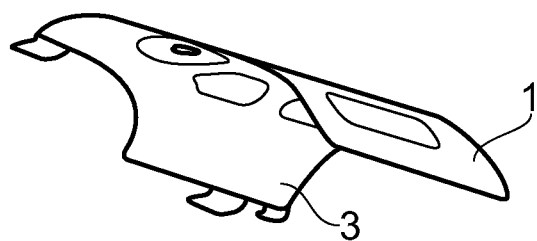
FIG. 1c shows a perspective view of a joined component.

FIG. 1a shows a front view of a joined component; FIG. 1b shows a back view of a joined component; FIG. 1c shows a perspective view of a joined component. The joined component 10 includes a first body 1 and a second body 3, welded together along multiple weld lines 5. These weld lines are located both at edge portions of the component, and also at central portions of the joined component for forming internal pockets 7 in the component. The component may be formed of 6/4 titanium alloy, and may subsequently undergo superplastic forming into a final shape.

The first and second bodies 1, 3 are, in this embodiment, skins, each being approximately 1 mm thick. Each body has datum features which include a central hole 9, and a cut out or slot 11 located on the bottom edge of the skin. The second body 3 also includes location tabs 13. These features match corresponding features in a holding fixture (described see below) to enable accurate location of the bodies within the holding fixture.

Figure 2A:
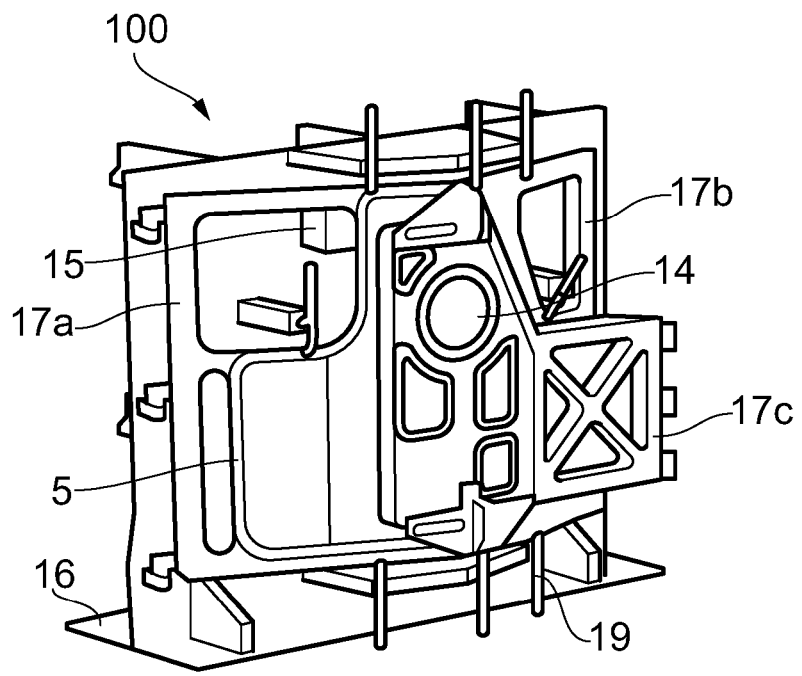
FIG. 2a shows a perspective view of a holding fixture in use.
Figure 2B:
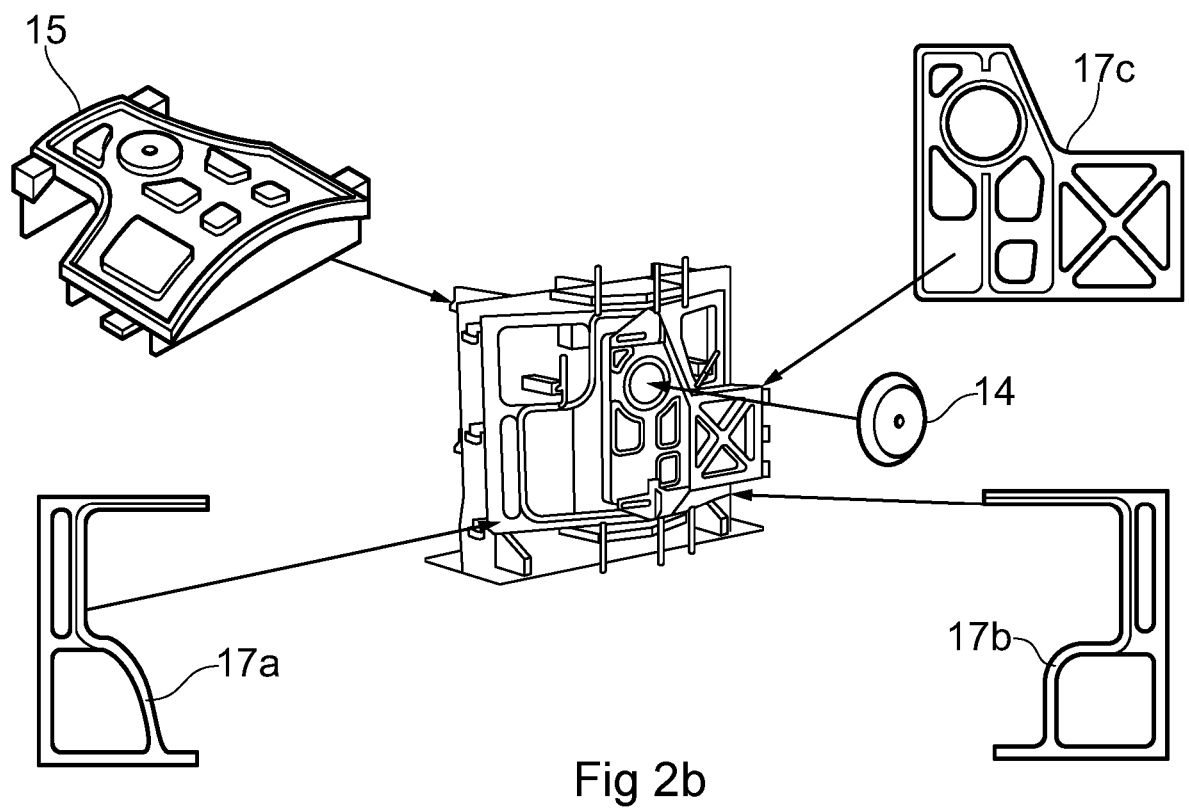
FIG. 2b shows separate views of a number of parts of the fixture with arrows indicating the parts' locations within the fixture.

FIG. 2a shows a perspective view of a holding fixture in use; FIG. 2b shows separate views of a number of parts of the fixture with arrows indicating the parts' locations within the fixture. The first and second bodies 1, 3 are correctly located in the fixture by matching of corresponding datum features of the bodies and the holding fixture. A central datum bung 14 is fitted to assist with this location. The bodies are then immobilised in the holding fixture 100 by a back clamp 15 and three front clamps 17a, b, c. The back clamp is rigidly attached to a base support 16. Two of the front clamps 17a, b are for clamping edge portions of the first and second bodies 1, 3, and one front clamp 17c is for clamping a central portion of the first and second bodies. The front clamps may be secured to the back clamp by toggle clamping, with toggles 19 applied to edge portions of each front clamp. Respective plenums (described below) are formed in the back and front clamps, the plenums being adapted to supply a shielding gas to back and front sides of the component along the weld lines 5.

Figure 3:
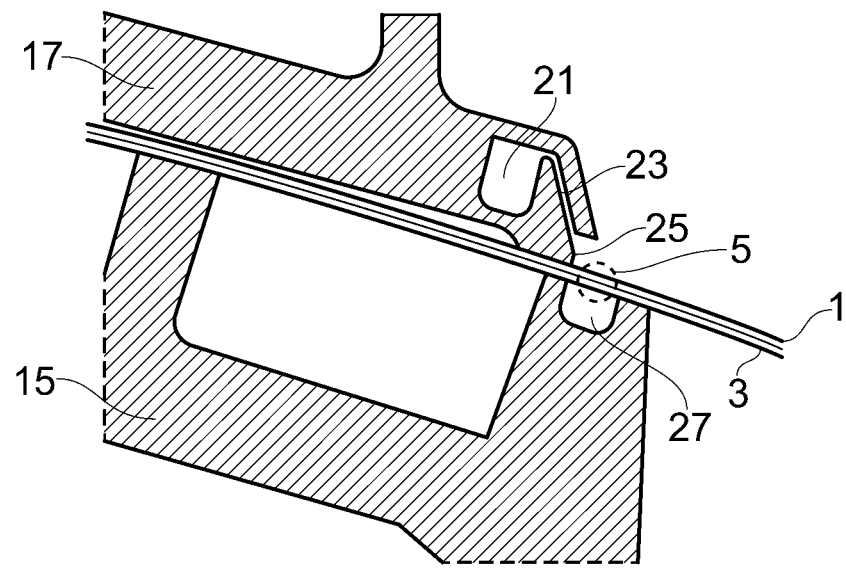
FIG. 3 shows a cross-section, transversely to a weld line, through back and front clamps of the holding fixture showing a plenum configuration.

FIG. 3 shows, for example, a cross-section, transversely to a weld line 5 (the location of which is indicated by a dashed circle), through the back clamp 15 and one of the front 17 clamps of the holding fixture 100 in use. The first 1 and the second 3 body are immobilised between the clamps. A plenum 21 is formed in the front clamp as an elongate channel which runs parallel to, but laterally offset from, the path of the weld line 5. Shielding gas is supplied through a slit 23 extending through the front clamp from the plenum 21 to an outlet 25 adjacent the front surface of the component at the weld line, such that a layer of shielding gas flows laterally over the weld line. A plenum 27 is also formed in the back clamp as a channel located directly behind, and opening onto, the weld line at the back surface of the component. Here, the plenum 27 is conveniently formed as a U-shaped channel. This configuration enables provision of shielding gas to both surfaces of the component along the weld line, whist avoiding any obstruction by the front clamp of the laser beam on its way to the weld line.

In FIG. 3, the first 1 and the second 3 bodies are shown immobilised with no gap between the bodies along the weld line 5. However, the holding fixture may be configured to immobilise the bodies such that a precisely controlled gap of e.g. 0.2 mm or less is formed between the bodies along the weld line. This can assist removal of vapours during the welding process.

Figure 4:
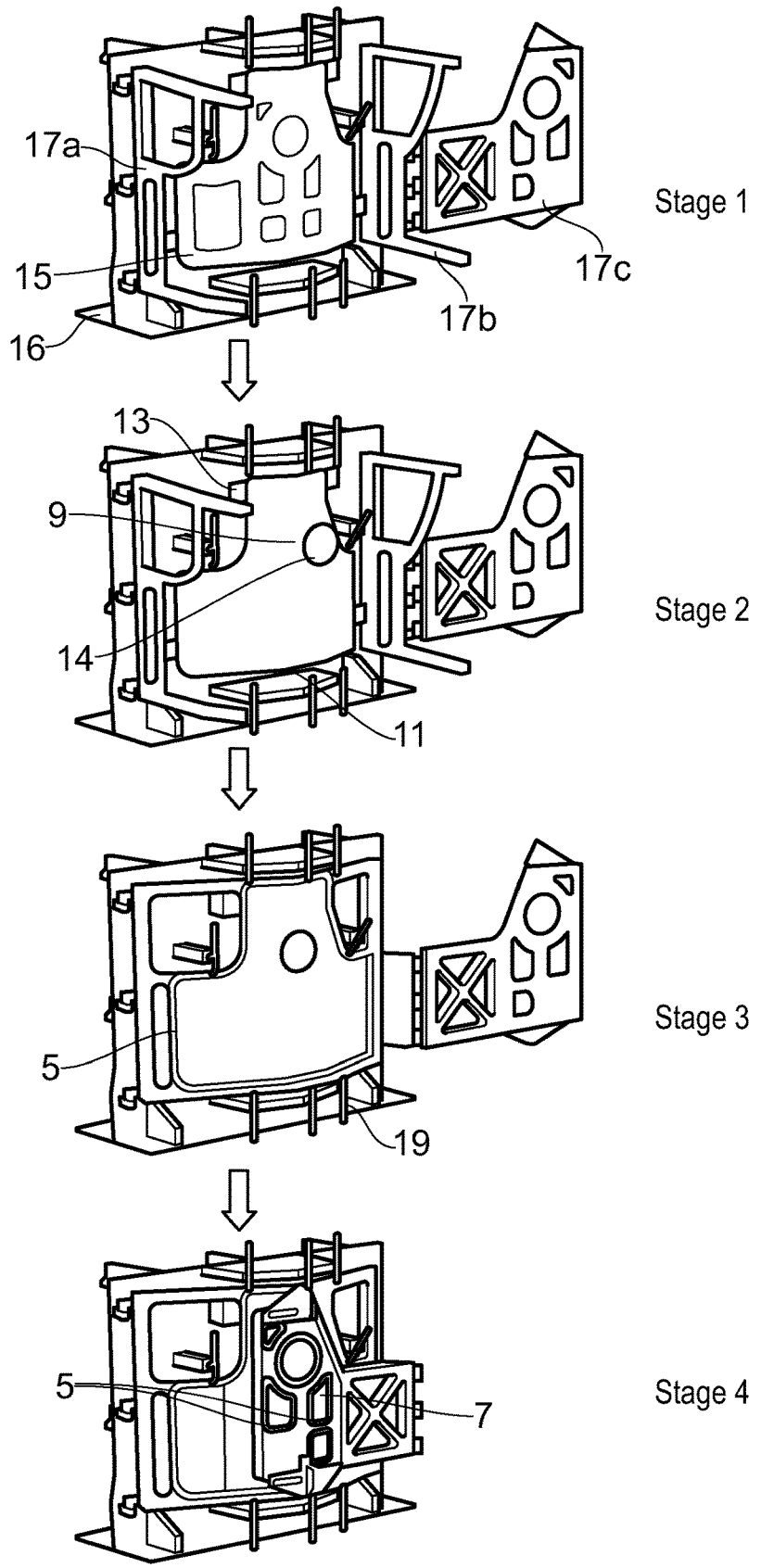
FIG. 4 shows a production process flow for a laser welding process using the holding fixture.

FIG. 4 shows a production process flow for a laser welding process which uses the holding fixture 100. The process flow shown is a two-stage clamping and welding process, with the first and second bodies welded together along multiple weld lines to form a joined component.

In Stage 1, the holding fixture 100 is attached to a machine bed (not shown) of a laser welding system by the base support 16, and ail the front clamps 17a, b, c are opened. The back clamp 15 remains in a fixed position relative to the machine bed throughout the process.

Stage 2 includes locating the first and second bodies 1, 3 to the holding fixture 100 by matching datum features 9, 11 and location tabs 13 of the first and second bodies with corresponding datum features on the holding fixture. This allows for accurate location of the skins to the holding fixture and can increase accuracy in the final built part A central datum bung 14 is then fitted. The central datum bung acts as a preliminary hold until the front clamps are applied (Stage 3), and aids loading the first and second bodies in a vertical position.

Stage 3 includes applying both left hand and right hand front clamps for immobilising the first and second bodies in the holding fixture. The left hand and right hand front clamps 17a, b are secured by toggle clamps 19 to provide even clamping forces around the component. The shielding gas supply is turned on, and argon (the shielding gas) is supplied to back and front sides of the component along a first weld line 5 around the perimeter of the component through plenums 21, 27 formed in respectively the front and back clamps. More particularly, each of the front clamps 17a, b may have a respective plenum 21 each covering its half of the first weld line, while the rear clamp may have a single plenum covering the whole first weld line. Once the plenums are sufficiently purged by the argon, the first and second skins 1, 3 are laser welded along the first weld line to form a joined component 10. The laser weld penetrates through the thickness of the component, from the front side to the back side of the component; but by supplying the argon to both sides of the weld from the plenums, it can be adequately protected from atmospheric gases, Performing the first weld before the third front clamp 170 is applied allows for un-interrupted welding along the first weld line, without obstruction by portions of the third clamp.

Stage 4 includes applying the third front clamp 17c to a central portion of the joined component, and securing this with a toggle clamp 19. The shielding gas supply is turned on, and argon (the shielding gas) is supplied to back and front sides of the component along additional weld lines 5, through further plenums 21, 27 formed in the front clamp 17c and the back clamp. After purging, the first and second skins 1, 3 are laser welded along the respectively weld lines, e.g, to form internal pockets 7 in the joined component 10. Again the laser welds which are formed penetrate through the thickness of the component, from the front side to the back side of the component.

Advantageously, the process such as that as shown in FIG. 4 may be semi-automated. This can reduce human error and improve consistency of manufacturing to decrease the number of components having manufacturing errors. Additionally, semi-automation can reduce process dwells or other delays within the manufacturing process.

Figure 5:
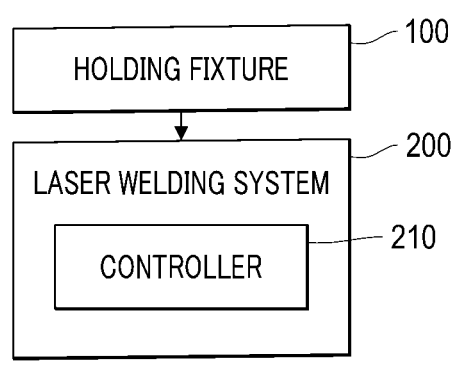
FIG. 5 shows a block diagram of a holding fixture and a laser welding system.

In the process, the holding fixture 100 may be used in combination with a laser welding system 200 having a controller 210, as shown in FIG. 5. The laser welding system controller 210 may be conveniently adapted to control the supply of the shielding gas from the plenums in the back and front clamps. This control may be, for example, CNC controlled input/output switching of the supply of argon shielding gas to parts of the fixture, with automatic switch-off of shielding gas once it is no longer needed. This can improve shielding gas utilisation and reduce associated process costs.

The process is easily adapted to suit a wide range of part geometries, in varying degrees of 3D orientation, by appropriate configuration of the holding fixture. The process is also easily adaptable to different weld types. Whilst FIG. 4 shows lap welding, butt welding or fillet welding may equally be performed using the process. Where appropriate for the type of welding, filler wire or powder may be used during the welding process.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:
1. A laser welding process comprising:
providing a first body and a second body for welding together along at least one weld line to form a joined component;
immobilising the first body and the second body in a holding fixture by a back clamp and a front clamp of the holding fixture, the front clamp including a first plenum formed within the front clamp, and the back clamp including a second plenum forming a channel along a surface of the back clamp facing the at least one weld line, the channel-shaped second plenum extending along and directly aligned on the at least one weld line so that the channel of the back clamp is aligned on the at least one weld line in a transverse direction of the component, which is a direction extending transverse to back and front sides of the component;
supplying, from the respective plenum formed in the back clamp and front clamp, a shielding gas to both the back and front sides of the component along the at least one weld line; and laser welding the first body and the second body together along the at least one weld line forming a laser weld, the laser weld penetrating from the front side to the back side of the component.

2. The laser welding process of claim 1, wherein the first body and the second body are immobilised in the laser welding holding fixture such that, before the laser welding to form the joined component, a gap of 0.2 mm or less exists between the first body and the second body along the at least one weld line.

3. The laser welding process of claim 1, wherein:
the first body and the second body have respective datum features, and
the process further includes, prior to immobilising the first body and the second body, locating the first body and the second body in the holding fixture such that the respective datum features of the first body and the second body match up with corresponding datum features of the holding fixture.

4. The laser welding process of claim 1, wherein the laser welding is performed from the front side of the component, the first plenum formed in the front clamp is laterally offset from the at least one weld line, and the shielding gas is supplied through a slit extending through the front clamp from the first plenum to an outlet adjacent the front surface of the component at the at least one weld line, such that that a layer of shielding gas is formed over the at least one weld line.

5. The laser welding process of claim 4, wherein the outlet of the slit is spaced a distance of at least 3 mm from a centre of the at least one weld line.

6. The laser welding process of claim 1, wherein the holding fixture has plural front clamps, each forming a respective first plenum for supplying the shielding gas to the front side of the component along a respective weld line.

7. The laser welding process of claim 1, wherein the channel is at least 2 mm wider than a width of a weld bead of the weld.

8. The laser welding process of claim 1, wherein the shielding gas is argon.

9. A holding fixture for holding a first body and a second body during a laser welding process in which the first body and the second body are welded together along at least one weld line to form a joined component, the holding fixture comprising:
a back clamp and a front clamp configured to immobilise the first body and the second body in the holding fixture;
a first plenum formed within the front clamp; and
a second plenum forming a channel along a surface of the back clamp facing the at least one weld line, the channel-shaped second plenum extending along and directly aligned on the at least one weld line so that the channel of the back clamp is aligned on the at least one weld line in a transverse direction of the component, which is a direction extending transverse to back and front sides of the component, the first plenum and the second plenum being configured to supply, in use, a shielding gas to the back and the front sides of the component along the at least one weld line.

10. The holding fixture according to claim 9, further comprising datum features which, in use, match up with corresponding datum features of the first body and the second body to locate the first body and the second body in the holding fixture prior to immobilising the first body and the second body in the holding fixture.

11. The holding fixture according to claim 9, wherein the first plenum formed in the front clamp is laterally offset from the at least one weld line, and the front clamp further includes a slit extending therethrough from the first plenum to an outlet adjacent a front surface of the component at the at least one weld line, such that, in use, the shielding gas is supplied through the slit to form a layer of shielding gas over the at least one weld line.

12. A combination of a holding fixture for holding a first body and a second body during a laser welding process in which the first body and the second body are welded together along at least one weld line to form a joined component, the holding fixture comprising: a back clamp and a front clamp configured to immobilise the first body and the second body in the holding fixture; a first plenum formed within the front clamp; and a second plenum forming a channel along a surface of the back clamp facing the at least one weld line, the channel-shaped second plenum extending along and directly aligned on the at least one weld line so that the channel of the back clamp is aligned on the at least one weld line in a transverse direction of the component, which is a direction extending transverse to back and front sides of the component, the first plenum and the second plenum being configured to supply, in use, a shielding gas to the back and the front sides of the component along the at least one weld line and a laser welding system having a controller adapted to control the supply of the shielding gas from the first plenum and the second plenum.

* * * * *